Jan. 4, 1949.　　　A. C. JOHNSON　　　2,457,821
TRACTOR POWER PLANT AND DRIVE WHEEL UNIT
Filed April 21, 1945　　　2 Sheets-Sheet 1

Inventor
ALFRED C. JOHNSON,
By Lyon & Lyon
Attorneys

Jan. 4, 1949. A. C. JOHNSON 2,457,821
TRACTOR POWER PLANT AND DRIVE WHEEL UNIT
Filed April 21, 1945 2 Sheets-Sheet 2
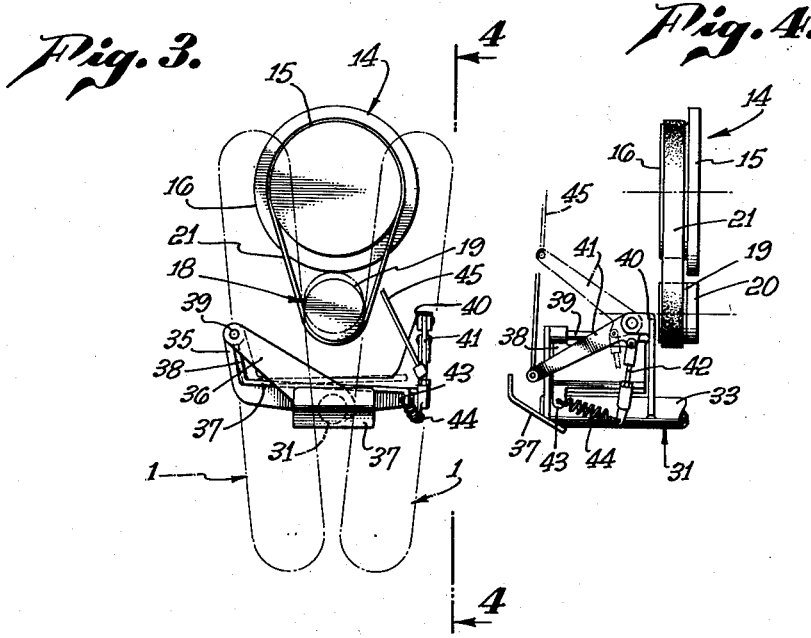
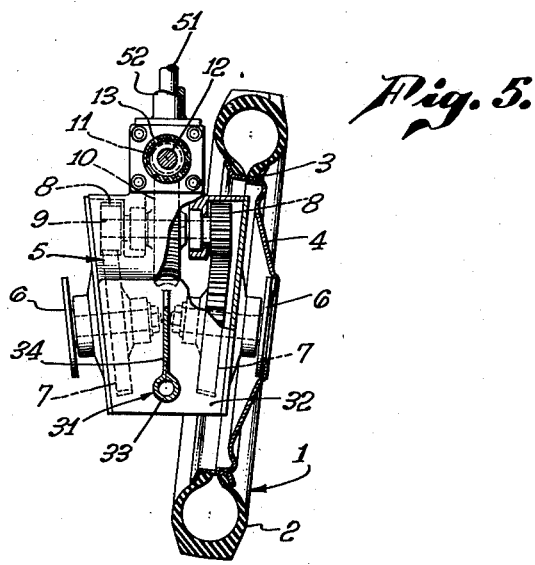
Inventor
ALFRED C. JOHNSON,
By Lyon & Lyon
Attorneys Patented Jan. 4, 1949

2,457,821

UNITED STATES PATENT OFFICE 2,457,821

TRACTOR POWER PLANT AND DRIVE WHEEL UNIT

Alfred C. Johnson, San Jose, Calif., assignor to Food Machinery and Chemical Corporation, a corporation of Delaware Application April 21, 1945, Serial No. 589,611

11 Claims. (Cl. 180—52)

My invention relates to tractors, and among the objects of my invention are:

First, to provide a tractor wherein the front wheels constitute the traction wheels and are cambered so that their lower peripheries are contiguous and are capable of tracking between narrow rows of crops, and being so positioned, eliminate the need of a differential.

Second, to provide a tractor which incorporates a unique mounting arrangement for the power unit and a novel drive connection from the power unit to the traction wheels.

Third, to provide a tractor which is particularly designed so that it may be readily controlled by a driver walking behind the tractor, although the tractor may be provided with a seat so that the driver may ride thereon.

Fourth, to provide a tractor wherein the transmission, which may be totally enclosed, is mounted directly over the axis of the traction wheel or wheels so that the weight of the transmission increases the traction of the traction wheels and needs no counter-balancing.

Fifth, to provide a tractor wherein the pivotal connection between the combined traction and steering unit and the chassis of the tractor is directly above the traction wheel or wheels, whereby the traction and steering unit may turn on an extremely short radius without disturbing the stability of the tractor, since the pull of the traction wheels is always in the direction of their travel, whether the tractor moves forwardly or backward.

Sixth, to provide a tractor whereby, in turning, the implements have a greater radial sweep than the traction, so that the implement may be maneuvered close to a wall or other boundary, and by reason of the close radius in which the tractor may be turned, cultivation of the corners or other difficult or confined portions of a field may be readily accomplished.

Seventh, to provide a tractor which provides ample clearance for rows of crops, yet is low enough to clear overhanging branches and may be arranged to handle a wide variety of cultivating implements or analogous devices, and wherein the rear or trailer wheels of the tractor are adjustable to vary both the height as well as the width of the tractor to accommodate different crops, or to position various cultivating instruments in the most advantageous position.

Eighth, to provide a tractor which has an extremely short turning radius, and which may be readily backed to facilitate operation in close or awkward places.

Ninth, to provide a tractor wherein the cultivating implements are located between the traction and trailing wheels in view of the driver and wherein the downward and backward pull of the implements when in cultivating engagement with the ground as well as the weight of the implements increases the traction of the traction wheels.

Tenth, to provide a tractor which is inherently safe and foolproof in operation, and which is economical of manufacture, thereby providing a tractor which is particularly suited for use in gardens and on small farms and under conditions in which a tractor of standard construction would be too large and expensive.

With the above and other objects in view as may appear hereinbefore, reference is directed to the drawings, in which:

Fig. 3 is a front view of the power unit mounting assembly showing also the driving and driven pulleys, as well as the traction wheels, the latter being indicated by broken lines.

Fig. 4 is a fragmentary, side elevational view of the power unit support as viewed from 4—4 of Fig. 3; and Fig. 5 is a sectional view through 5—5 of Fig. 2, the gear case or housing, however, being shown in elevation, and one of the traction wheels being omitted.

Figures 1, 2:
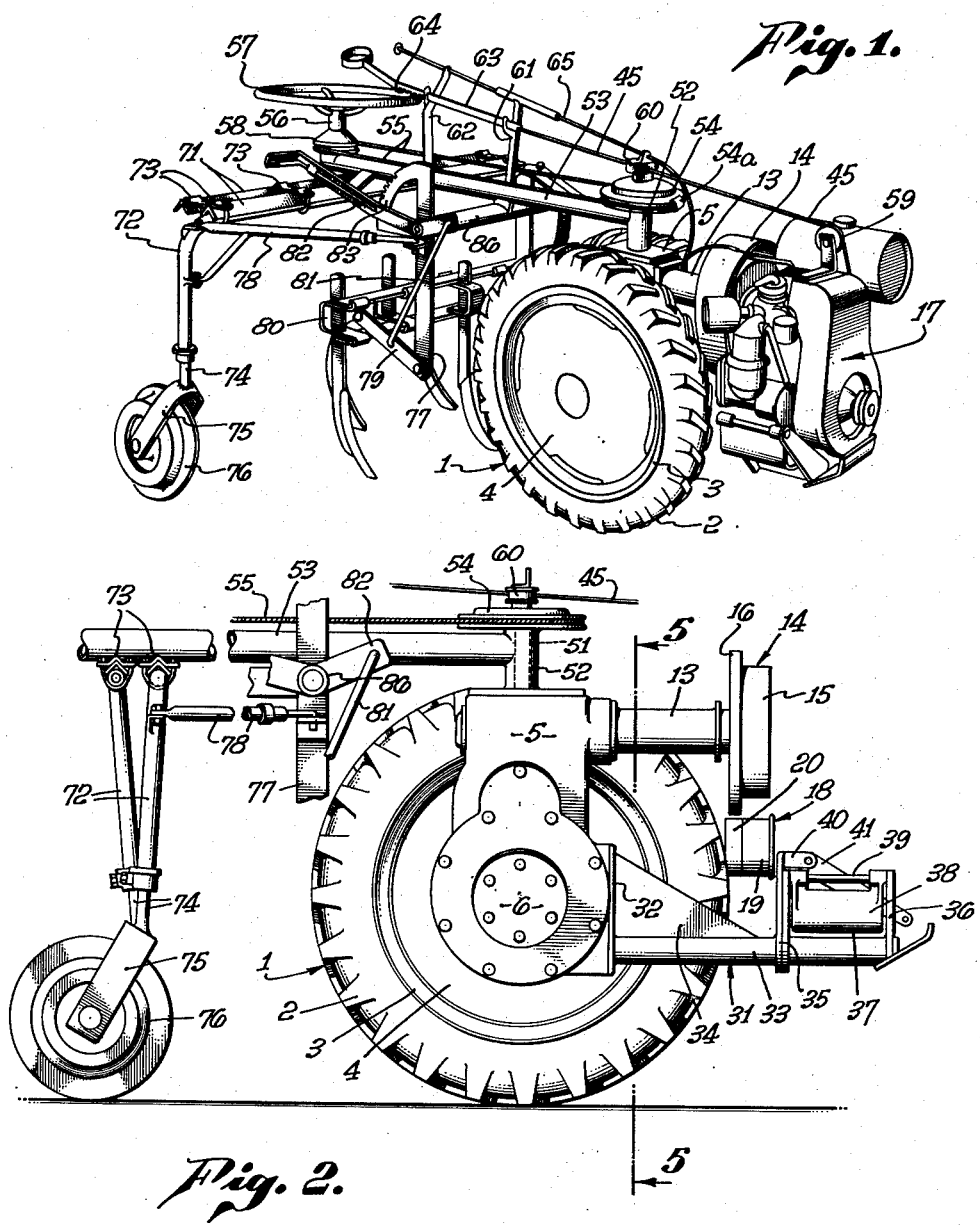
Fig. 1 is a perspective view of my tractor.
Fig. 2 is an enlarged, fragmentary, side elevational view thereof with the near traction wheel and the power unit removed to facilitate the illustration.

The tractor is supported preferably by a pair of traction wheels 1, which are disposed in converging planes with their lower peripheries in contiguous relation, though a single traction whel can be used. The traction wheels preferably include pneumatic tires 2 mounted on the rims 3 which are secured to discs 4. Between the discs 4 is positioned a gear or transmission case 5. The sides of the gear case which face the traction wheels converge downwardly, and from these sides protrude flanged stub shafts 6 to which the wheels 1 are attached by their discs 4 as shown best in Fig. 5.

Mounted on the stub shafts within the gear case are bevel gears 7, their bevels corresponding to the cambered or converging relation of the traction wheels 1. The bevel gears 7 are driven by pinion gears 8 mounted on a countershaft 9 disposed in a horizontal axis above the stub shafts 6. The countershaft carries a worm gear 10 which meshes with a worm 11 secured to a drive shaft 12 which projects forwardly from the gear case 5. The drive shaft is contained in a sleeve 13. The forward end of the drive shaft supports a pulley 14 having a forward drive face 15 and a rearward drive flange 16. Thus it will be seen that the gear or transmission case completely enters the gear assembly, protecting it against dust and damage.

As will be described hereinafter, an engine unit 17 is positioned forwardly of the pulley 14. The crankshaft of the engine unit carries a drive pulley 18 positioned below the pulley 14. The drive pulley 18 is provided with a forward drive face 19 and a rearward drive face 20. The forward drive faces 15 and 19 of the pulleys 14 and 18, respectively, are adapted to be connected by a belt 21. In the structure shown a flat belt is employed. However, the faces 15 and 19 may be provided with channels to receive a conventional V-belt. The rearward drive face 20 is preferably formed of a material such as rubber or a so-called synthetic rubber, and is adapted to bear directly against the rearward drive flange 16 if the drive pulley 18 is raised. The drive connections between the two pulleys are such that when the belt 21 is in operation the tractor moves forwardly, whereas when the flange 16 and drive face 20 are in engagement, the belt is loose and the tractor is driven rearwardly at a slower speed than its forward travel. By placing the drive pulley 18 in an intermediate position a neutral position obtains.

The gear case 5 is provided with a forwardly extending engine mounting bracket 31 which comprises a plate 32 secured to the forward side of the gear case 5, a horizontally extending tubular beam 33, and a reinforcing gusset or web 34. The beam 33 projects beyond the pulleys 18 and 14 and is provided with a pair of laterally directed upwardly extending arms 35 and 36. An engine mounting plate 37 which is provided with an upturned end 38 is journaled between the extremities of the arms 35 and 36 on a journal rod 39. An additional arm 40 secured to the beam 33 extends laterally and upwardly in an opposite direction from the arm 36. The extremity of this arm is provided with a forwardly directed yoke which pivots a lever 41.

Pivotally secured to the lever near its fulcrum is a link 42 the length of which is adjustable. The lower end of the link is pivotally secured to the corresponding end of the engine mounting plate 37, the engine mounting plate extending horizontally over the beam 33. This end of the mounting plate is provided with an anchor lug 43 which is connected by a spring 44 to a downwardly directed projection of the link 42 in such a manner that the lever 41 tends to rotate clockwise as viewed in Fig. 4, this being the direction which tends to lower the engine mounting plate 37.

The extended end of the lever 41 is connected to a control line 45 which is operated in the manner to be described hereinafter.

The upper side of the gear case 5 supports a vertically positioned journal shaft 51 indicated by dotted lines in Fig. 2. The journal shaft 51 fits within a sleeve bearing 52 secured to the end of a main chassis beam 53. The main chassis beam 53 may be in the form of a tube and extends rearwardly in a substantially horizontal plane. The journal shaft 51 projects above the bearing 52 and is secured to a pulley 54. The pulley 54 is connected by an endless cable 55 to a steering means which includes a steering column 56 mounted at the rear end of the main chassis beam 53 and supporting a steering wheel 57. A pulley 58 carried by the column 56 receives the cable 55. The endless cable 55 is attached by a clamp 54ª to the pulley 54 to prevent slippage of the cable thereon.

The control line 45 extends upwardly and over a pulley 59 mounted on top of the engine unit 17 and continues therefrom over the center of the pulley 54. A pair of guide rollers 60 are journaled about vertical axes on top of the pulley 54 so that as the wheels and gear case turn relative to the beam 53, the control line passes through substantially the center of rotation. The beam 53 supports a pair of guide brackets 61 and 62 which slidably receive an operating bar 63 attached at its forward end to the control line and provided with a handle at its rear end in convenient relation to the steering wheel 57. The operating bar 63 is provided with suitable notches 64 so that it may be secured in various positions. When the operating bar is in an intermediate position the belt 21 is slack and the tractor is in "neutral." When the operating bar is moved forwardly the engine and its mounting bracket tilt downwardly, tightening the belt 21 and effecting a connection with the wheels, whereby the tractor moves forwardly. If the operating bar 63 is drawn backwardly, a direct connection is made between the pulleys 14 and 18 to cause the tractor to move rearwardly. It is preferred to so arrange the notches 64 that they do not lock the operating bar when it is desired to put the tractor in "reverse." Thus a continued pull on the operating bar 63 is required in order to back the tractor.

The carburetor control or other control desired for the engine unit, such as the line 65, also extends rearwardly into convenient relation with the steering wheel.

Near the rear end of the main chassis beam 53 are mounted cross bars 71. These bars are placed parallel with each other and are preferably angle irons positioned with their open sides downwardly in the form of inverted V's. The cross bars receive wheel supports 72 which are in the form of L-shaped pipes. Suitable clamps 73 secure each wheel support by one leg under its respective cross bar 71. The other leg of each wheel support extends downwardly and receives an extension member 74. The lower end of each extension member 74 is provided with a yoke 75 in which is journaled a wheel 76. These wheels may be provided with pneumatic tires, but preferably they are metal wheels and are provided with relatively large flanges. In addition, the wheels are made relatively heavy or provided with weights so that the rear end of the tractor has sufficient weight to fully balance the parts which project forwardly of the traction wheels 1, while the flanges serve to prevent lateral shifting of the rear portion of the tractor when the traction wheels are turned.

Forwardly of the cross bars 71 there is secured to the main chassis beam 53 a cross bar 86, the ends of which are provided with vertical struts 77. The struts are connected to the wheel supports 72 by extensible braces 78 which are pivotally connected to the vertical legs of the wheel supports.

Pivotally mounted on the lower ends of the struts 77 are levers 79 which support a suitable tool carrying beam 80. An operating link 81 may extend from one of the levers 79 to an operating lever 82 pivotally mounted at the end of the cross bar 86 and is provided with detent means adapted to cooperate with a notched quadrant 83 provided at the upper end of the corresponding strut 7'.

Various cultivating tools may be attached to the beam 80, or entire tool supporting assemblies of various kinds may be attached to the struts 77. While one form of cultivating tool is shown attached to the beam 80, it should be noted that this is in the way of illustration only, and that it is contemplated that a wide variety of tools suitable for the performance of any of the various operations connected with the planting and growing of crops may be interchangeably mounted under the chassis between the traction wheels and trailer wheels.

By reason of the fact that the traction wheels converge and their lower peripheries are in contiguous relation, they afford mutual support; that is, the effective tread width is essentially the overall width of the two tires including the space therebetween, whereas if the tires were located on two independent wheels in the conventional manner, the effective tread width would only be the width of the tires alone. This is of primary importance in a tractor which is intended for operation over soft ground. Also, because of the contiguous arrangement of the wheels, the tread width is well within the normal spacing between the crops so that the tractor may be readily guided between narrow rows of crops. A further advantage is found in the fact that the contiguous relation of the traction wheels, eliminates the need of a differential therebetween.

The trailer wheels are capable of lateral extension so that the width of the tractor may be adapted to the crop spacing. It should also be noted that the framework may be so arranged that a row of crops may pass longitudinally outside the traction wheels and inside the trailer wheels, and that such crop may virtually be as high as the traction wheels. On the other hand, the parts of the tractor do not extend appreciably above the traction wheels; consequently, the tractor may be operated in and around trees having low hanging branches.

In the construction shown, the driver walks behind the tractor and sets the tractor for a forward movement by forward movement of the operating bar 63, and sets the tractor in position for rearward movement by pulling rearwardly on the operating bar 63. And, as heretofore pointed out, the operating bar is so arranged that it must be held in its rearward position so that the driver need only let loose of the operating bar if he wishes to stop rearward travel of the tractor.

It should be noted, however, that if it is desired to arrange the tractor to carry the driver, it is merely necessary to extend the main chassis beam, place a seat thereon, and perhaps move the steering wheel forwardly a convenient distance.

It will be observed that the pivotal connection between the traction unit and the frame structure is about an axis which is in the plane defined by the inclined wheel axes and the center of contact between the wheels and the ground, and that the beam 53 clears the tops of the traction wheels 1. Thus, the tractor may turn at a sharp angle (in fact, at right angles or more in either direction, or a total swing of more than 180°) relative to the frame structure so that the tractor may be turned about a short radius; in fact, virtually within its own length. Furthermore, during turning, the implements have a greater radial sweep than the traction unit so that they can be guided close to a fence or other boundary, even in corners.

The weight of plows or similar cultivating implements and their downward pull when in cultivating engagement with the ground causes a downward pull on the traction wheels and thereby increases the traction of the traction wheels. Also, the weight of the transmission is centered on the traction wheels, increasing their traction.

It is not necessary that the plow or other cultivating instrument be centered behind the traction wheels, but may be located at one side. This is made possible because the height and lateral displacement of the idler wheels are independently adjustable. Thus, one idler wheel may travel directly behind the plow and bear against the solid ground forming a wall of the furrow to withstand the resultant side thrust.

Many other embodiments of the invention may be resorted to without departing from the spirit of the invention.

I claim:

1. A tractor comprising: a pair of downwardly converging traction wheels disposed with their lower portions in contiguous relation; a housing between said traction wheels; a motor for driving said wheels supported from said housing forwardly of the peripheries of said traction wheels; a frame structure extending rearwardly from said housing; trailer wheels cooperating with said traction wheels and housing to support said frame structure; and means forming a steerable connection between said housing and frame structure, said means including a vertical post, the axis of which passes through the axes of said wheels, a journal on said frame structure fitting said post, a wheel on said post, a steerable wheel on said frame structure, and a flexible connection between said wheels to rotate said post in said journal.

2. A tractor comprising: a pair of juxtaposed traction wheels disposed in downwardly converging planes with their lower peripheries in contiguous relation; a drive housing interposed between said wheels and including a transmission for said traction wheels a drive shaft for said transmission and a motor mount both projecting forwardly from said housing and beyond the peripheries of said wheels; a motor unit carried by said motor mount and operatively connected with said drive shaft; idler wheels; and a frame structure supported in part by said idler wheels; and means for pivotally connecting said frame structure to said drive housing, said means including a vertical shaft extending upwardly from said drive housing, a journal on said structure fitting said shaft, and steering wheel means secured to the upper end of said shaft for rotating said shaft in said journal.

3. A tractor comprising: a frame structure; a steerable traction assembly and idler wheels supporting said frame structure; said traction assembly including a pair of cambered traction wheels disposed with their lower peripheries in contiguous relation to afford mutual support and to track in substantially a single path between rows of crops; a drive housing carried by and between said traction wheels; a cantilever motor bracket extending horizontally from said drive housing and beyond said traction wheels; a motor carried by said bracket and operatively connected with said traction wheels; and means for turning said traction assembly as a unit with respect to said frame structure said means including a journal in said frame structure, a vertical steering post extending from said drive housing upwardly through said journal, a steering member mounted on the upper end of said post, a steering wheel mounted at the rear portion of said frame structure, and means operatively connecting said steering wheel and steering member.

4. A tractor comprising: a gear housing including a pair of outwardly projecting downwardly sloping stub shafts, a pair of bevel gears on said shafts, a countershaft, a pair of pinion gears on said countershaft and in mesh with said bevel gears, a worm gear on said countershaft, a drive shaft and a worm thereon in mesh with said worm gear, said drive shaft projecting laterally; a pair of cambered wheels mounted on said stub shafts and positioned with their lower peripheries in close proximity; a bracket extending from said housing under said drive shaft; a motor carried by said bracket and connected with said drive shaft; a frame structure journaled on said gear housing, and idler wheels for said frame structure.

5. A tractor comprising: a frame structure including a forwardly directed motor mounting bracket and a vertically directed pivot means; a transmission incorporated in said frame structure and including a forwardly directed drive shaft, laterally directed axles and drive means between said shaft and axles; juxtaposed traction wheels for said axles; a motor adjustably mounted on said bracket; a selective drive between said motor and said drive shaft operative by movement of said motor; means for moving said motor to operate said selective drive, said means including a cable passing through the axis of said pivot means; and a trailing unit including trailing wheels and a frame connected with said pivot means.

6. A tractor comprising: a frame structure including a forwardly directed motor mounting bracket and a vertically directed pivot means; a transmission incorporated in said frame structure and including a forwardly directed drive shaft, laterally directed axles and drive means between said shaft and axles; juxtaposed traction wheels for said axles; a motor carried by said bracket and located forwardly of said traction wheels; a selective drive connecting said motor and said drive shaft; a control means for said selective drive passing through the axis of said pivot means; and a trailing unit including trailing wheels and a frame connected with said pivot means.

7. A tractor comprising: a pair of juxtaposed traction wheels; a frame and transmission means between said traction wheels and carried thereby, said means including a vertical pivot projecting above said traction wheels, a forwardly directed mounting bracket and a forwardly directed drive shaft; a motor carried by said mounting bracket; a selective drive between said motor and said drive shaft; a trailing unit including trailing wheels and a frame extending therefrom to said pivot means clear of said traction wheels; and a control means for said selective drive including operating means carried by said frame and a connecting means passing therefrom through the axis of said pivot means to said selective drive.

8. A tractor, comprising: a frame structure including a forwardly directed motor mounting bracket and a vertically disposed pivot means; a transmission incorporated in said frame structure and including a forwardly directed drive shaft, laterally directed axles and drive means between said shaft and axles; juxtaposed traction wheels for said axles; a motor mounted on said bracket; a control for said motor including a cable extending therefrom through the axis of said pivot means; and a trailing unit including trailing wheels and a frame connected with said pivot means.

9. A tractor, comprising: a frame structure including a forwardly directed motor mounting bracket and a vertically disposed pivot means; a transmission incorporated in said frame structure and including a forwardly directed drive shaft, laterally directed axles and drive means between said shafts and axles; juxtaposed traction wheels for said axles; a motor mounted on said bracket; a control for said motor including a cable extending therefrom through the axis of said pivot means; a trailing unit including trailing wheels, and a frame having a journal fitting said pivot means; a steering member mounted on said pivot means; a steering wheel mounted on said frame and a drive connection between said steering member and steering wheel.

10. A tractor, comprising: a pair of juxtaposed traction wheels; a frame and transmission means between said traction wheels and carried thereby, said means including a vertical pivot post projecting above said traction wheels, a forwardly directed mounting bracket and forwardly directed drive shaft; a motor carried by said mounting bracket; a trailing unit including trailing wheels and a frame extending therefrom to said pivot post clear of said traction wheels; and a control means for said motor including operating means carried by said frame and a connecting means passing therefrom through the axis of said pivot post to said motor.

11. A tractor, comprising: a pair of juxtaposed traction wheels; a frame and transmission means between said traction wheels and projecting forwardly thereof; a vertical steering pivot post projecting from said means above said traction wheels; a motor carried by the forwardly projecting portion of said means; a trailing unit including trailing wheels and a frame extending therefrom to said pivot post clear of said traction wheels; and a control means for said motor including operating means carried by said frame and a connecting means passing therefrom through the axis of said pivot post to said motor.

ALFRED C. JOHNSON.

REFERENCES CITED

The following references are of record in the file of this patent:

UNITED STATES PATENTS

| Number | Name | Date |
|---|---|---|
| 735,774 | Johnston | Aug. 11, 1903 |
| 828,713 | Coffman et al. | Aug. 14, 1906 |
| 1,210,055 | Fairman | Dec. 26, 1916 |
| 1,219,930 | Ferriss | Mar. 20, 1917 |
| 1,292,398 | Krotz | Jan. 21, 1919 |
| 1,296,022 | Townsend | Mar. 4, 1919 |
| 1,406,209 | Murnane | Feb. 14, 1932 |
| 2,423,962 | Olin | July 25, 1922 |
| 1,431,311 | Krotz | Oct. 10, 1922 |
| 1,489,952 | Lawson | Apr. 8, 1924 |
| 1,616,295 | Yourtee | Feb. 1, 1927 |
| 1,764,851 | Palm | June 17, 1930 |
| 1,833,036 | Peters | Nov. 24, 1931 |
| 2,039,749 | Strehlow | May 5, 1936 |
| 2,166,450 | Smalley | July 8, 1939 |
| 2,202,810 | Blanc | June 4, 1940 |
| 2,406,944 | Choate et al. | Sept. 3, 1946 |